United States Patent Office 3,066,911
Patented Dec. 4, 1962

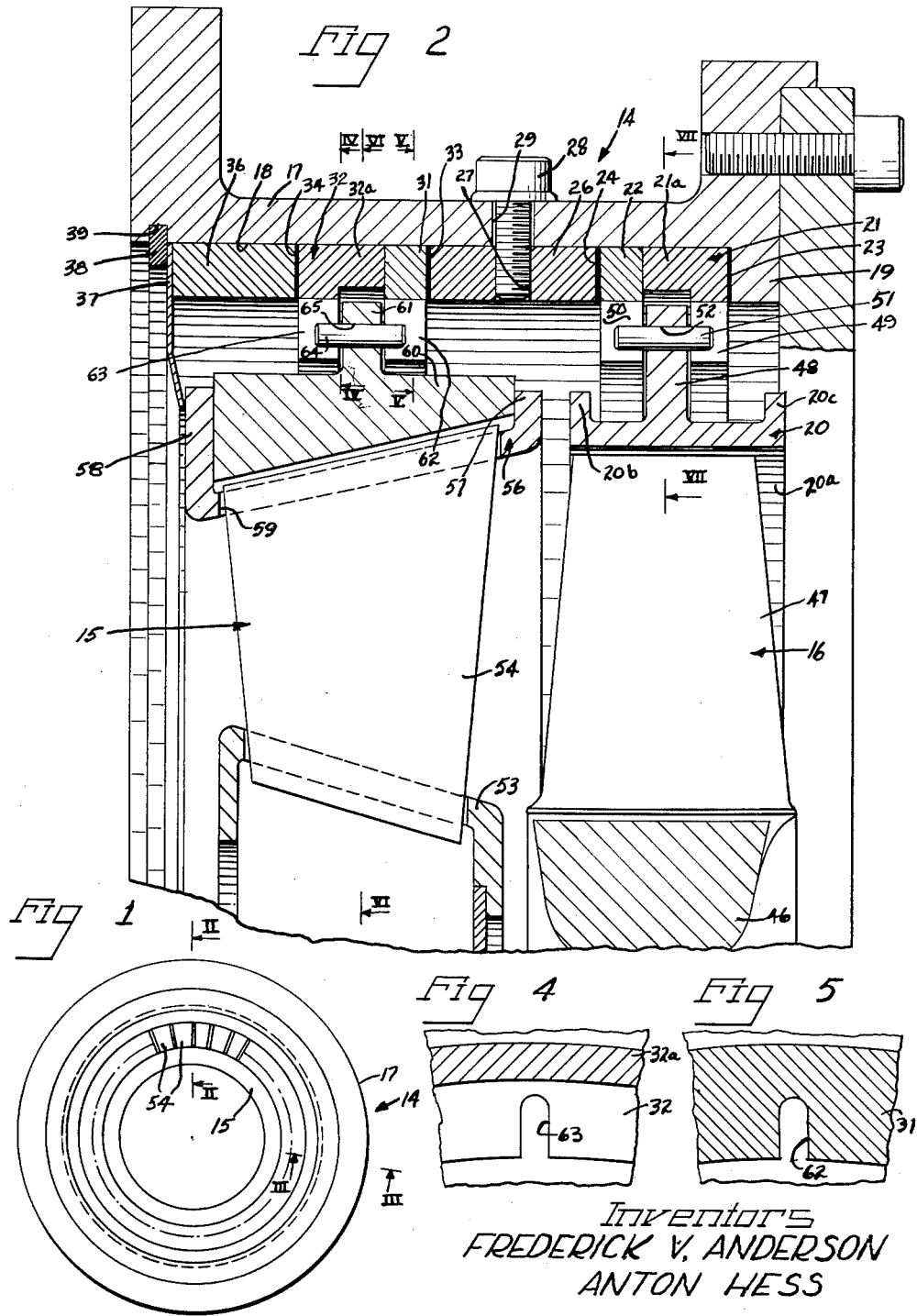

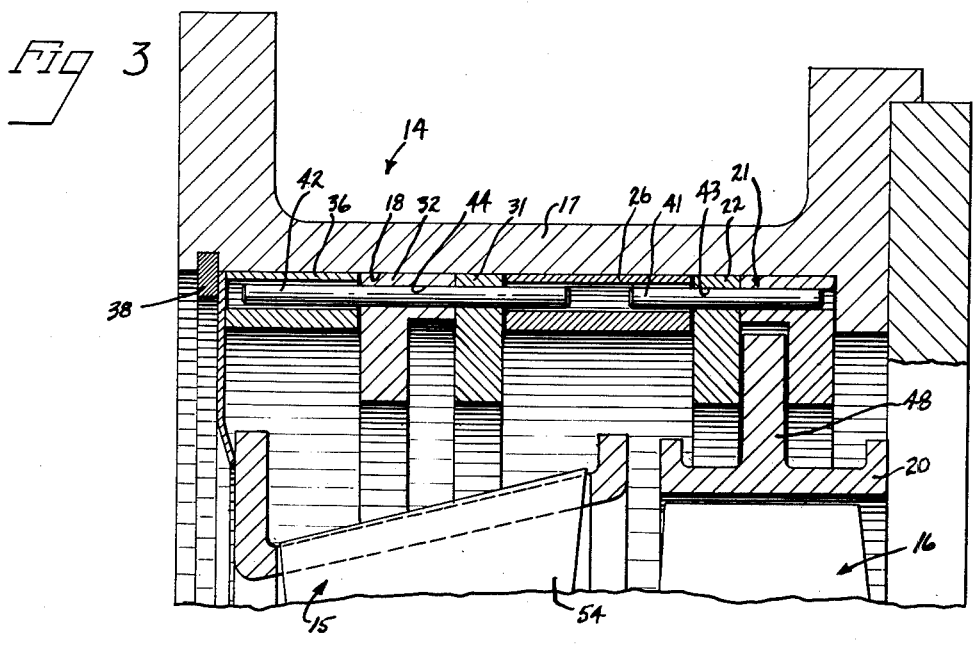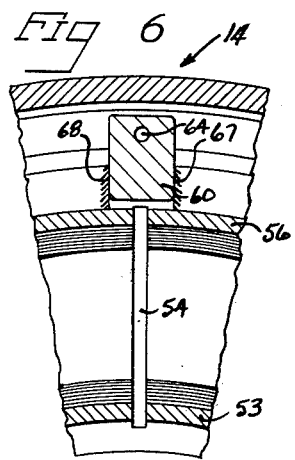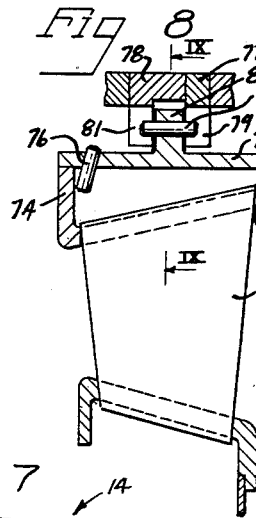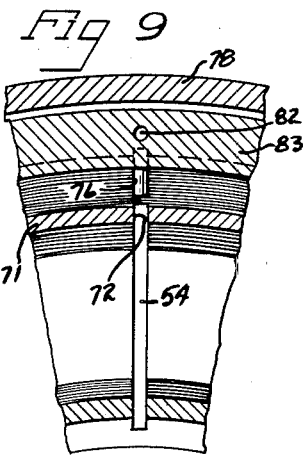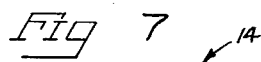

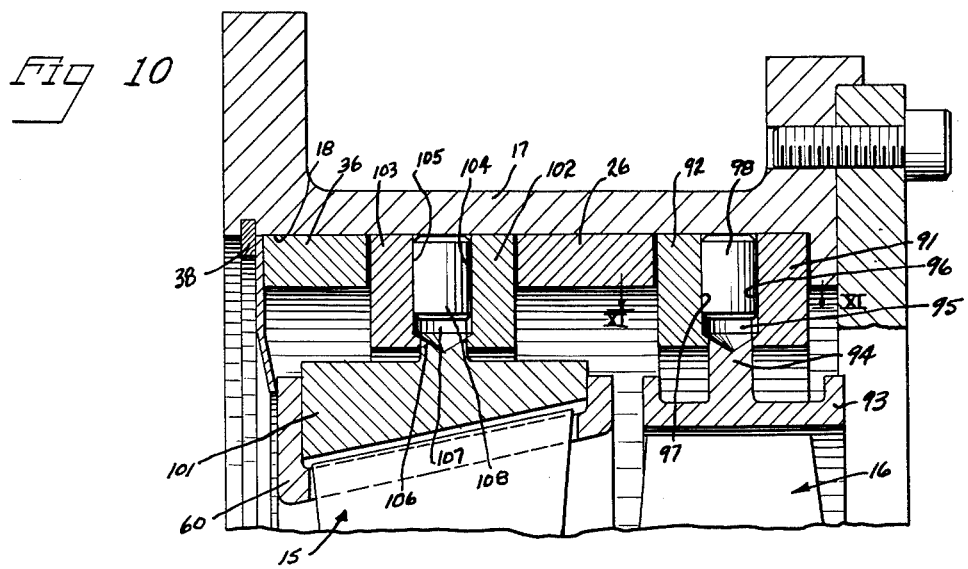
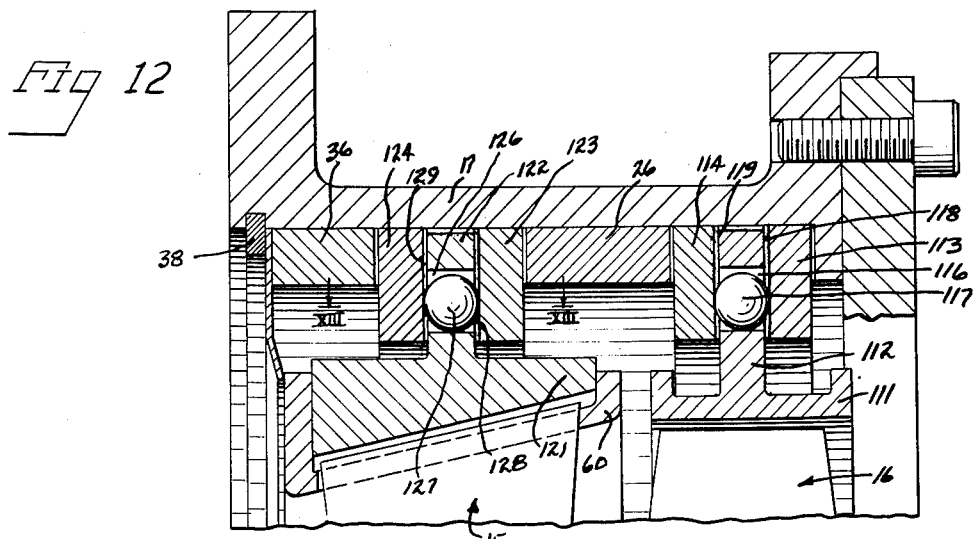
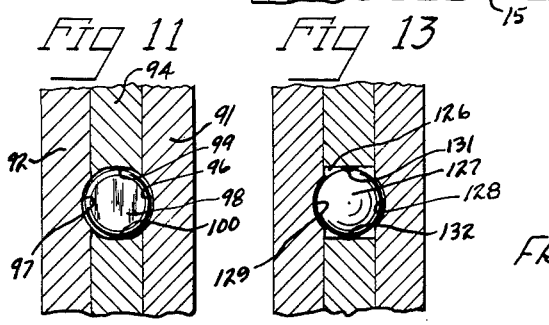
Inventors
FREDERICK V. ANDERSON
ANTON HESS

3,066,911
NOZZLE AND TURBINE WHEEL
SHROUD SUPPORT
Frederick V. Anderson and Anton Hess, Willoughby, Ohio, assignors to Thompson Ramo Wooldridge, Inc., Cleveland, Ohio, a corporation of Ohio
Filed May 12, 1959, Ser. No. 812,653
8 Claims. (Cl. 253—65)

The present invention relates to improvements in turbine structures and particularly to an improved support construction for turbine shrouds for rotors and stators.

The present invention contemplates use with a mechanism such as a gas turbine having an annular row of radially extending stator nozzle vanes supported at their inner ends by a stator ring, and at their outer ends by a nozzle shroud ring. The rings and vanes define nozzles for directing a flow of heated operating gas to the blades of an adjacent rotor which has a rotor shroud ring surrounding the outer ends of the vanes. As the gases flow through the nozzles heat energy is imparted to the nozzle vanes, causing physical expansion of the nozzle and of the rotor shroud. Current designs for small turbines call for continuous nozzle construction heavy enough to absorb thermal stresses induced and caused by the restraining action of the containing nozzle shroud which is actually at a lower temperature than the nozzle. This temperature differential brings about thermal stresses in the shroud causing distortions. The distortion may be so severe so as to completely destroy whatever gas sealing technique may be used and may cause the nozzle to interfere with the high speed rotor which causes bearing overloads due to out of balance conditions brought about by the removal of mass from the rotor at the point of nozzle interference.

One of the major problems in turbine design relates to maintaining concentricity under all temperature conditions. In order to accomplish this, distortions created by the supporting mechanism, and restrictions imposed on the free thermal expansion of the physical parts must be eliminated.

Accordingly, it is an object of the present invention to provide an improved support structure for a stator shroud ring of a turbine and for a rotor shroud ring which will maintain the shroud rings concentric with the axial center of the turbine during all temperature conditions.

Another object of the invention is to provide an improved structure for supporting the shroud rings of a turbine which substantially eliminates distortions due to thermal changes.

A further object of the invention is to provide an improved support for a nozzle shroud ring and a rotor shroud ring of a turbine wherein the positions will be positively fixed in an axial and a circumferential direction, but will be unrestricted in a radial direction to maintain accurate relative positions without introducing distortions with change in operating temperatures, and with temperature differential in the parts.

Another object of the invention is to provide an improved turbine structure wherein nozzle and shroud assemblies are free to float independently of each other, and are free to expand radially and axially.

A further object of the invention is to provide an improved shroud support for a turbine which will support thrust loads without imposing radial restrictions on the expansion and contraction.

A further object of the invention is to provide an improved shroud support structure having the foregoing attributes which is simple to assemble, is inexpensive to construct and wherein the parts are easily interchangeable.

Another object of the invention is to provide an improved support for adjacent parts for supporting the shrouds of a turbine, and wherein adjustment is easily made to take care of the stack-up nozzle to turbine bucket gap and other necessary variations.

Other objects and advantages will become more apparent with the teachings of the principles of the invention in connection with the disclosure of the preferred embodiments in the specification, claims and drawings, in which:

FIGURE 1 is an end elevational view of a section of a turbine of the type adapted to embody the principles of the present invention;

FIGURE 2 is an enlarged detailed sectional view taken substantially along the radial line II—II of FIGURE 1;

FIGURE 3 is an enlarged detailed sectional view taken substantially along radial line III—III of FIGURE 1;

FIGURE 4 is a detailed fragmentary sectional view taken substantially along line IV—IV of FIGURE 2;

FIGURE 5 is a detailed fragmentary sectional view taken substantially along line V—V of FIGURE 2;

FIGURE 6 is a detailed fragmentary sectional view taken substantially along line VI—VI of FIGURE 2, and shown in somewhat reduced size;

FIGURE 7 is a fragmentary sectional view taken substantially along line VII—VII of FIGURE 2;

FIGURE 8 is a fragmentary sectional view taken along a radial line of a turbine and illustrating another embodiment of the invention;

FIGURE 9 is a sectional view taken substantially along line IX—IX of FIGURE 8;

FIGURE 10 is a sectional view taken along a radial plane of a turbine embodying a modified form of the invention;

FIGURE 11 is a sectional view taken substantially along line XI—XI of FIGURE 10;

FIGURE 12 is a sectional view taken along a radial plane of a turbine embodying a modified form of the invention; and, FIGURE 13 is a sectional view taken substantially along line XIII—XIII of FIGURE 12.

As shown in the drawings:

One form of a turbine is shown in FIGURES 1 through 7 at 14, provided with a stator 15 and a rotor 16. Operating fluid, such as heated gas, passes through nozzles formed by the stator 15 to drive the rotor 16. FIGURES 2 and 3 illustrate a turbine section which may be incorporated with other sections to form an axial flow turbine. The turbine section has a housing 17 provided with fixed support means for the fixed parts, shown in the form of an inner cylindrical surface 18. At one end the surface is provided with an inwardly extending annular flange 19, and a first pair of bracketing flange members or rings 21 and 22 are slid within the cylindrical surface 18, and a shim ring 23 may be positioned between the flange 19 and the flange ring 21. The first set of flange rings 21 and 22 are provided for guidingly supporting a shroud ring 20 for the rotor 16.

Within the cylindrical surface 18 of the housing and abutting the bracketing flange ring 22 is a spacer ring 26 with a radial threaded hole 27 to receive a lock screw 28 which extends through a hole 29 in the housing to fix the position of the spacer ring 26.

Also held within the cylindrical support surface 18 are bracketing flange members or rings 31 and 32 and a shim ring 33 may be positioned between the flange ring 31 and the spacer ring 26. Another shim ring 34 may be positioned beside the bracketing ring 32 and another spacer ring 36 abuts the shim ring 34 within the cylindrical support surface 18. Positioned at one side of the spacer ring 36 is an annular sealing ring 37 which extends radially inwardly and prevents gas from flowing through the housing outside of the stator 15. The assembly of bracketing rings and spacer rings is locked against the inwardly extending flange 19 by an outwardly expanding spring snap ring 38 which is seated in an annular groove 39 formed in the support surface 18 of the housing.

The bracketing flange rings and the spacer rings are held against circumferential displacement with respect to each other by tie pins or holding pins 41 and 42. The tie pin 41 extends through an axial bored hole 43 through the spacer ring 26, and bracketing rings 21 and 22. The holding pin 42 extends through an axially bored hole 44 through the spacer ring 36, the bracketing rings 31 and 32 and the spacer ring 26.

As particularly illustrated in FIGURES 2, 3 and 7, the rotor 16 includes an annular row of radially extending blades 47 mounted on a support hub 46 and positioned within the shroud ring 20 just within the inner annular surface 20a thereof. The shroud ring has outwardly turned annular edges 20b and 20c, and has a centrally located intermediate flange 48. This flange extends all of the way around the shroud 20 and is sandwiched between the bracketing flange rings 21 and 22. The flange ring 21 is L-shaped in cross section with an upper leg 21a to provide the gap between the bracketing flange rings for receiving the intermediate flange 48. The intermediate flange is held axially between the bracketing flanges and is fitted to provide axial support for the shroud 20, but to permit expansion with temperature increase.

The bracketing flanges 21 and 22 and the intermediate flange 48 are provided at circumferentially spaced locations with connectors which fix the position of the flange members in a circumferential direction, but which guide their relative movement and limit it to solely radial relative movement to accommodate radial expansion and contraction of the shroud 20 in excess of the expansion and contraction of the housing 17. The connectors are in the form of inwardly facing radially extending slots 49 and 50 in the bracketing rings 21 and 22, respectively. An axially extending guide pin 51 is firmly mounted in an axial bored opening 52 in the intermediate flange at each of the slots and the guide pin 51 in coaction with the slots limits the relative shifting movement between the flange rings to radial movement.

As particularly illustrated in FIGURES 2 through 6, the stator is provided with an annularly arranged row of stator blades 54 positioned to form nozzles therebetween. The stator blades are suitably fastened at their inner ends to a stator ring 53 and at their outer ends to a shroud ring 56. The shroud ring 56 is illustrated as having outwardly turned annular flanged edges 57 and 58, and provided with axially extending circumferentially spaced slots 59 for receiving the blades 54. The blades are suitably secured in the slots 59.

Between the flanged edges 57 and 58 of the nozzle shroud 56 are positioned shroud segments 60 which provide parts of connectors between the shroud 56 and the housing. The shroud segments 60 are in the form of blocks, as illustrated in FIGURE 6, and are positioned at spaced circumferential intervals, and in a preferred form, eight shroud segments are secured to the shroud at evenly spaced intervals. The shroud segments 60 are each provided with outwardly extending ears or intermediate flanges 61 which are sandwiched between the bracketing flange rings 31 and 32. For this purpose, the flange ring 32 is L-shaped with an upper leg 32a to provide a space between the flange rings 31 and 32. The space is such to provide support for the intermediate flange segments 61 and to permit expansion with thermal change. The bracketing flange rings 31 and 32 are provided with inwardly facing radially extending slots 62 and 63, for the rings 31 and 32, respectively, at each of the shroud segments. A guide pin 64 is secured within an axial bore 66 through each of the intermediate flange segments 61, and the pin guidingly slides in the slots 62 and 63. The shroud segments 60 are secured at their ends, such as by welding, to the edges 57 and 58 of the nozzle shroud 56, as illustrated at 67 and 68 in FIGURE 6.

In the arrangement of FIGURES 8 and 9, the nozzle shroud assembly is the same in basic construction requirements as the arrangement of FIGURES 1 through 7, except the nozzle shroud ring does not utilize the shroud segments illustrated at 60 in FIGURE 2. A shroud ring 71 is provided with slots 72 for receiving and holding the nozzle vanes 54. Flanged edges 73 and 74 extend outwardly from the nozzle shroud 71 and support at their outer edges a shroud band 75. The shroud band is provided with a notch 75a for seating on the edge of the flanged edge 73, and pins 76 are extended through the holes in the shroud band to prevent the band from shifting outwardly with respect to the flanged edge 74 of the shroud 71.

Mounted within the housing are bracketing flange rings 77 and 78. An intermediate flange 83 extends annularly around the shroud band projecting outwardly from its outer surface and is sandwiched between the bracketing rings 77 and 78. At spaced circumferential intervals, the bracketing rings are provided with inwardly facing radially extending slots 79 and 81, and guide pins 82 extend axially through the intermediate flange 83 to slidingly support and guide the shroud on the bracketing rings 77 and 78.

It will thus be seen that in each of the forms described, the plurality of pin and slot connectors which are spaced circumferentially around the shrouds serve to guide and control the direction of shroud expansion, and maintain concentricity of each of the shroud rings, and of the shroud rings with respect to the axial center of the turbine.

In the arrangement of FIGURES 10 and 11, a modified form of a connector and guide is used for supporting rings on the support means within the housing. The housing 17 has the inner cylindrical surface 18 holding bracketing flange rings 91 and 92. These provide a support for a rotor shroud 93 which annularly surrounds the blades of the rotor 16. The rotor shroud has an outwardly extending intermediate flange 94 which is sandwiched between the bracketing flange rings 91 and 92. A radial bore 95 extends radially inwardly, centered with respect to the intermediate flange 94, and of a size to extend into the bracketing flange rings 91 and 92 and provide grooves or channels 96 and 97 therein. A cylindrical pin 98 is positioned in the bore 95, and engages arcuate sides 99 and 100 of the bore 95 in the intermediate flange 94 and also slidingly engages the grooves 96 and 97. A plurality of similar pins and radial bores are provided at circumferentially spaced locations around the rings 91 and 92 to thereby maintain the shroud 93 concentric with the axial center of the turbine during expansion and contraction.

The nozzle blades of the stator 15 are supported in a similar manner to the arrangement of FIGURES 1 through 7, and are provided with the shroud ring 60 to which is attached shroud segments 101. Bracketing flange rings 102 and 103 are mounted within the cylindrical surface 18 of the housing, between the spacer rings 26 and 36. The shroud segments each have an outwardly extending ear or intermediate flange segment 106 which is sandwiched between the bracketing rings 102 and 103. Radially inwardly extending bores 107 and drilled in each of the intermediate flange segments and are of a size to extend into the surfaces of the bracketing rings 102 and 103 to form radially extending grooves or channels 104 and 105. A guide pin 108 is positioned in the bore to fix the circumferential position of the intermediate flange segments 106 and guide the segments in radial movement relative to the rings 102 and 103 to maintain the shroud 60 concentric with respect to the center of the turbine.

In the arrangement of FIGURES 12 and 13, an annular shroud 111 surrounds the blades of the rotor 16 and is provided with an annular intermediate flange 112. This flange is sandwiched between bracketing flange rings 113 and 114 held by the housing. The intermediate flange is provided with an axially extending opening 116 in which is journaled a spherical metal ball 117. Radially extending channels or grooves 118 and 119 are cut in the inner faces of the bracketing rings 113 and 114 to provide a guide path for the ball 117. These channels may be provided by drilling radially between the bracketing rings 113 and 114 so that the channels 118 and 119 are arcuate to provide a smooth path for the ball 116.

The nozzle vanes of the stator 15 are held by the annular shroud ring 60 which is provided with shroud segments 121 which are circumferentially spaced around the shroud ring and secured thereto. Each of the shroud ring segments 121 have a radially extending ear or shroud segment 122 which is sandwiched between bracketing rings 123 and 124 held within the housing 17. The flange segments 122 have axially extending openings 126 in which is carried a spherical ball 127. The ball is of a high temperature material, and is guided in arcuate grooves 128 and 129 extending radially in the inner faces of the bracketing rings 123 and 124. The ball is guided at the sides of the axial openings in the intermediate bracket segments 122, as shown by the surfaces 131 and 132 to fix the circumferential position of the shroud, but permit it to expand radially so that it will remain concentric with the rotor shroud 111 and with the axial center of the turbine.

As a summary of operation of the embodiment of FIGURES 1 through 7, the stator nozzle vanes 54 are held at their outer ends in a shroud ring 56 which is supported by a support surface 18 within the housing 17. Between the support surface and the shroud are bracketing flange rings 31 and 32 and intermediate flange segments 61, connected by shroud segments 60 to the shroud. The intermediate flange segments have axially extending pins 64 which slide in radial slots 62 and 63 in the bracketing flanges, and the pins and slots are spaced circumferentially around the shroud to concentrically position the shroud with respect to the axial center of the turbine and permit relative movement between the shroud and housing with thermal expansion and contraction. The shroud 20 for the rotor 16 is similarly supported by a continuous intermediate flange 48 sandwiched between bracketing flange rings 22 and 23 and guided by a pin 51 slidable in radial guide slots 49 and 50.

Thus it will be seen that we have provided an improved support structure for shroud members in a turbine which meets the objectives and advantages set forth above. The support arrangement is capable of providing axial support and maintaining the nozzle and shroud assemblies concentric, supporting thrust load and having a minimum of thermal distortion. The mechanism is simple in construction and provided for easy arrangement of spacing parts by the installation of shims to take care of nozzle or turbine bucket gap.

We have, in the drawings and specification, presented a detailed disclosure of the preferred embodiments of our invention, and it is to be understood that we do not intend to limit the invention to the specific forms disclosed, but intend to cover all modifications, changes and alternative constructions and methods falling within the scope of the principles taught by our invention.

We claim as our invention:

1. In a turbine structure, a combination comprising an annular row of radially extending vanes concentrically arranged with respect to an axial center of the turbine, a housing having fixed support means positioned outwardly of the outer ends of the vanes, shroud means between said support means and the outer ends of the vanes, an intermediate flange member connected to one of said means, bracketing flange members connected to the other of said means and engaging the outer radial surfaces of said intermediate flange member to prevent axial movement thereof and to permit radial shifting movement, means defining radially extending channels between the surfaces of said flange members, and means positioned in said channels to prevent relative rotational movement between said flange members and to guide the flange members in relative radial movement so that said shroud means can expand and contract radially without losing its concentricity with said axial center.

2. In a turbine structure, a combination comprising an annularly arranged row of stator vanes concentrically positioned with respect to an axial center of the turbine, a housing having fixed support means positioned outwardly of the vanes, shroud means between the vanes and the support means, an intermediate flange member connected to one of said means, bracketing flange members connected to the other of said means and engaging the radial surfaces of said intermediate flange member to prevent axial movement thereof, a plurality of circumferentially spaced radially extending cylindrical bores in said intermediate flange member with the bores being of a diameter greater than the thickness of the intermediate flange member and extending into the adjacent surfaces of the bracketing flange members, and radial guide pins positioned in said bores to hold the intermediate flange member and shroud means concentric with respect to said axial center during expansion and contraction.

3. In a turbine structure, a combination comprising a housing having fixed support means positioned therein, shroud means positioned within said support means, a plurality of annularly arranged radially disposed turbine vanes radially inside of said shroud means and concentric with said shroud means and an axial center of the turbine, an intermediate flange member connected to one of said means, bracketing flange members connected to the other of said means and having inner surfaces engaging the outer radial surfaces of said intermediate flange member to prevent axial movement thereof and permit relative radial shifting movement between said surfaces of said intermediate flange member and of said bracketing flange members with change in relative radial sizes due to unequal thermal expansion and contraction, spherical bearings positioned between said intermediate flange member and said bracketing flange members, and means defining radially extending guide channels in said flange members guidingly supporting the bearings and preventing relative rotation between said flange members permitting only relative radial movement to support the shroud in coaxial relationship with said axial center.

4. In a turbine structure, a combination comprising a housing having fixed support means positioned therein, shroud means positioned within said support means, a plurality of annularly arranged radially disposed turbine vanes radially inside of said shroud means and concentric with said shroud means and an axial center of the turbine, an intermediate flange member connected to one of said means, bracketing flange members connected to the other of said means and having inner surfaces engaging the outer radial surfaces of said intermediate flange member to prevent axial movement thereof and permit relative radial shifting movement between said surfaces of said intermediate flange member and of said bracketing flange members with change in relative radial sizes due to unequal thermal expansion and contraction, spherical bearings positioned between said intermediate flange member and said bracketing flange members, a plurality of pockets formed in said intermediate flange member, radially extending grooves in said bracketing members facing said pockets, and spherical shaped ball bearings in said pockets extending into said grooves and guiding and retaining said shroud means in coaxial relationship with said axial center during expansion and contraction.

5. In a stator structure for a turbine or the like, an annularly arranged row of radially extending stator vanes concentrically positioned with respect to an axial center of the turbine, means for supporting the inner ends of said vanes, a continuous shroud ring extending annularly and attached to the outer ends of said vanes, a plurality of separate shroud segments rigidly attached at spaced circumferential intervals to said shroud ring at the radial outer side thereof, a plurality of connectors secured to said segments and projecting outwardly thereof, a housing, annular bracketing flange rings supported in the housing and receiving the connectors between their axial surfaces, and means fixing the circumferential position of said segments in said flange rings and guiding the relative movement of the segments in a radial direction so that the shroud ring will be held in an axial direction between the flange rings and will remain concentric with the axial center of the turbine.

6. In a stator structure for a turbine or the like, an annularly arranged row of radially extending stator vanes concentrically positioned with respect to an axial center of the turbine, means for supporting the inner ends of said vanes, a continuous shroud ring extending annularly and attached to the outer ends of said vanes, a plurality of separate shroud segments rigidly attached at spaced circumferential intervals to said shroud ring at the radial outer side thereof, a plurality of connectors secured to said segments and projecting outwardly thereof, a housing, annular bracketing flange rings supported in the housing, one of said flange rings being L-shaped with the axially extending portion of the L engaging the other flange ring and the radially extending portion of the L holding the connectors between it and the other flange ring, and means fixing the circumferential position of said segments in said flange rings and guiding the relative movement of the segments in a radial direction so that the shroud ring will be held in an axial direction between the flange rings and will remain concentric with the axial center of the turbine.

7. In a turbine structure, the combination comprising a housing having a cylindrical inner support surface, a first pair of bracketing rings within said support surface, a second pair of bracketing rings within said support surface, a spacer ring between said first and second pairs of bracketing rings, shims between said spacer rings and said bracketing rings, a rotor having an annular row of rotor vanes extending radially and positioned inwardly from said first pair of bracketing rings, a first continuous annular shroud ring positioned outside of said rotor vanes, a first intermediate flange secured to said first shroud ring and projecting outwardly between said first bracketing rings, a plurality of spaced inwardly facing radial circumferentially separated slots in said first bracketing rings, a plurality of axially extending pins projecting guidingly into said slots and connected to said first intermediate flange for positioning the shroud ring concentric with an axial center of the turbine, an annular row of radially extending stator vanes positioned axially adjacent said rotor vanes, support means secured to the inner ends of said stator vanes, a second annular shroud ring secured to the outer ends of said stator vanes and concentric with the axial center of the turbine, spaced shroud segments rigidly attached at circumferentially spaced locations to said second shroud ring radially outwardly of the second shroud ring, second intermediate flange members on said shroud segments projecting radially outwardly between said second bracketing rings, a plurality of inwardly opening radially extending circumferentially spaced slots in said second bracketing rings, axially extending guide pins in said second intermediate flange members projecting into said slots in the second bracketing rings and supporting the second shroud ring concentric with the axial center of the turbine during expansion and contraction, and an annular seal extending between said second shroud ring and said housing preventing the flow of turbine operating fluid outwardly of said second shroud ring.

8. In a turbine structure, the combination comprising a housing having a cylindrical inner support surface,
a first pair of bracketing rings within said support surface,
a second pair of bracketing rings within said support surface,
a spacer ring between said first and second pairs of bracketing rings,
shims between said spacer rings and said bracketing rings,
means secured to the housing located at the ends of said first and second pairs of bracketing rings holding them in stacked relationship within the inner housing surface,
a rotor having an annular row of rotor vanes extending radially and positioned inwardly from said first pair of bracketing rings,
a first continuous annular shroud ring positioned outside of said rotor vanes,
a first intermediate flange secured to said first shroud ring and projecting outwardly between said first bracketing rings,
circumferentially spaced connectors between said first bracketing rings and said first intermediate flange,
circumferentially facing surfaces on said connectors facing circumferential surfaces on said bracketing rings and circumferential surfaces on said intermediate flange permitting free guided radial movement of the intermediate flange with respect to said bracketing rings with relative thermal expansion and contraction therebetween,
an annular row of radially extending stator vanes positioned axially adjacent said rotor vanes,
support means secured to the inner ends of said stator vanes,
a second annular shroud ring secured to the outer ends of said stator vanes and concentric with the axial center of the turbine,
spaced shroud segments secured at circumferentially spaced locations to said second shroud ring.
and second circumferentially spaced connectors between said shroud segments and said second bracketing rings,
circumferentially facing surfaces on said second connectors facing circumferential surfaces on said shroud segments and circumferential surfaces on said second bracketing rings permitting free relative radial movement between the shroud segments and second bracketing rings with relative thermal expansion and contraction therebetween and maintaining the second shroud ring in coaxial position with respect to the axial center of the turbine.

References Cited in the file of this patent

UNITED STATES PATENTS

| 2,427,244 | Warner | Sept. 9, 1947 |
| 2,447,942 | Imbert et al. | Aug. 24, 1948 |
| 2,488,867 | Judson | Nov. 22, 1949 |
| 2,488,875 | Morley | Nov. 22, 1949 |
| 2,530,908 | Ray | Nov. 21, 1950 |

FOREIGN PATENTS

| 261,192 | Switzerland | Aug. 1, 1949 |
| 491,992 | Italy | Oct. 19, 1951 |
| 689,270 | Great Britain | Mar. 25, 1953 |
| 741,138 | Great Britain | Nov. 30, 1955 |